Patented Oct. 1, 1940

2,216,130

UNITED STATES PATENT OFFICE 2,216,130

PROCESS FOR THE PRODUCTION OF POLYNUCLEAR CARBON COMPOUNDS

Mathias Pier and Karl Schoenemann, Heidelberg, Germany, assignors to I. G. Farbenindustrie Aktiengesellschaft, Frankfort-on-the-Main, Germany No Drawing. Original application November 2, 1934, Serial No. 751,251. Divided and this application April 9, 1937, Serial No. 135,882. In Germany November 23, 1933

7 Claims. (Cl. 260—668)

The present application for patent is a division of our copending application Ser. No. 751,251, filed November 2, 1934.

The invention described and generically claimed in the said application relates to the production or recovery of unitary polynuclear carbon compounds of high molecular weight, not only such as contain at least four rings in the molecule, but also such as contain less than four rings. The said compounds may belong to the isocyclic or to the heterocyclic group. As examples of such compounds may be mentioned alkyl-naphthalenes, naphthofluorenes, triphenylene, anthracene, alkyl-anthracenes, acenaphthene, retene, pyrene, chrysene, picene, fluorene, fluoranthene, truxene, naphthanthracene, naphthacene, decacyclene, diphenylene sulphide, diphenylene oxide, brasane, carbazole, phenylnaphthylcarbazole, acridine and other ring systems, in part still higher condensed ring systems, as well as their homologues and hydrides which in pure form are valuable as initial materials for organic syntheses.

It has been disclosed in the said application Ser. No. 751,251 that carbon compounds of high molecular weight of the said kind can be prepared in a simple and inexpensive manner and in large amounts, by a process which in its most important forms utilizes the known destructive hydrogenation of bituminous crude substances. Whenever in this specification we simply speak of "destructive hydrogenation," we wish this expression to be understood in a broad sense, including not only a treatment with hydrogenating gases under conditions resulting in a more or less drastic breaking down of the molecules of the initial materials, but also under conditions under which mainly a hydrogenation takes place or under which only some of the constituents of the initial materials are considerably attacked or degraded, others being left unaltered or substantially unaltered.

Before describing in detail the several methods which we have developed for the recovery of the polynuclear compounds, the modes of carrying through the destructive hydrogenation and the other treatments which are made use of as separate steps in the said methods, as for example the dehydrogenation, the precipitation of asphalts and others, will be explained.

The destructive hydrogenation

The destructive hydrogenation of the bituminous substances may be carried out according to known methods in different ways as shown for instance in U. S. P. 1,890,434. Of course, the conditions to be employed during the destructive hydrogenation may be adapted to the requirements of each particular case in any suitable manner. For example in the working up of mineral coal, the latter may be finely ground and advantageously freed from the gangue and the basic constituents, which may be effected by treatment with acid-reacting agents, as for example, hydrochloric acid. The catalysts are advantageously added dissolved in water or organic solvents. They may also be incorporated with the initial materials in a solid form, if desired applied to carriers. The coal thus pretreated is then made into a paste with oil and subjected to the destructive hydrogenation. By suitable selection of the temperature, as for example from 380 to 500° C. preferably 440° to 470° C., a pressure of 200 atmospheres or more and the throughput, as for example 0.5 kilogram of coal per liter of reaction space per hour, the reaction can readily be so carried out that the resulting product consists mainly of constituents of high boiling point.

When it is desired to obtain destructive hydrogenation products which are particularly rich in hydrogen not too high temperatures, in most cases not more than 470° C., and the highest possible partial pressure of hydrogen, preferably more than 150 atmospheres, should be employed. The constituents of high boiling point of such destructive hydrogenation products as are obtained while splitting to benzine, may also be used for the process.

The destructive hydrogenation products may, if necessary, be freed from phenols by treatment with alkalies and from pyridine bases by treatment with acids.

When oils substantially free from hard asphalt are to be treated by destructive hydrogenation mainly under hydrogenation conditions so that no splitting to products of low boiling point, or in any case no considerable splitting to such products takes place, it is advantageous to work at comparatively low temperatures, usually between about 200° and 500°, and preferably between 250° and 450° C., and in the presence of large amounts of catalysts, preferably such as have mainly a hydrogenating action and but a slight splitting action, especially those of the 4th to the 8th groups of the periodic system, such as molybdenum, chromium, tungsten and vanadium and especially their compounds, such as oxides, sulphides or halides. For the same reason it is frequently preferable to employ the catalysts while arranged rigidly in the reaction chamber. The catalytic substances may be precipitated on carriers, such as active carbon, active silica or brown coal low temperature coke which has been freed from ash or neutralized, i. e. treated with acid. The catalysts are preferably employed in a shaped condition, such as pellets, tablets or cubes. The period during which the reacting materials are in contact with the catalyst at the reaction temperature is so selected that the hydrogenation takes place without appreciable splitting to products of low boiling point. The treatment effects mainly the reduction of the phenols, sulphur compounds and bases and the hydrogenation of the unsaturated or aromatic compounds.

When it is desired to prepare or recover polynuclear compounds containing side chains in the molecule, mineral coal destructive hydrogenation products may be used and the procedure may be as follows:

The mineral coal is finely ground and advantageously freed from the gangue and the basic constituents of the ash as previously suggested. The coal is then mixed with finely ground catalytic substance or impregnated with a solution of the latter. The amount of catalyst is preferably from 0.05 to 5 per cent. The coal thus pretreated is then made into a paste with oil, preferably derived from the same coal, and subjected to destructive hydrogenation. The addition of catalyst may also be made after the coal is made into a paste; catalyst may also be added in batches in different phases of the process. Furthermore different catalysts may be employed. Thus for example a coal which has been provided with a molybdenum or tin compound may have added thereto after heating up a halogen or sulphur compound, as for example carbon tetrachloride or carbon disulphide. The reaction temperature is advantageously between 400° and 440° C. The amount to be passed through the reaction chamber per hour is preferably between 0.05 and 0.3 kilogram of coal paste (consisting of 1 part of coal and 1 part of oil) per liter of reaction space. The coal paste heated to the reaction temperature is led through the reaction chamber and the resulting product is led into a separator in which a level of liquid is maintained. The temperature in this vessel is kept at only about 5° to 30° C. below the reaction temperature so that all heavy oil freshly formed from the coal passes in the vapor phase together with the hydrogen into an adjacent vessel. The product distilling over into the latter consists of from 30 to 50 per cent of constituents boiling up to 325° C. and from 70 to 50 per cent of heavy oil which latter is free from asphalt and solid constituents.

In some cases it is even possible by a chemical pretreatment of the initial materials to obtain particular results during the destructive hydrogenation. For example, by first treating mineral coal or graphite with oxidizing agents, as for example nitric acid, potassium chlorate, chlorine or oxygen, the molecules are rendered more readily attackable and can then be split up into comparatively large and uniform molecules. By sulphonating the material under conversion either before or between the several stages of the treatment and converting the sulphonation products into the alkali metal salts it is possible directly to produce hydroxyl compounds during the destructive hydrogenation. By acting with ammonia on materials containing oxygen or halogen or sulphonic acid groups in the presence of such catalysts as the double compound of zinc chloride and ammonia, amino compounds may be produced. An addition of for example phenols or hydrocarbons rich in hydrogen or halogenated hydrocarbons often favours the formation of valuable compounds of high molecular weight.

*The dehydrogenation and related methods*

The usefulness of a dehydrogenation and related methods is due to the fact that in the destructive hydrogenation the cyclic compounds to be recovered are often converted into the corresponding hydro compounds, the boiling points of which usually are about from 20° to 90° C. or more lower than those of the non-hydrogenated compounds originally present in the initial materials; for example anthracene boils at about 360° C. while perhydroanthracene (tetradecahydroanthracene) boils at about 275° C., and chrysene boils at about 448° C. while perhydrochrysene boils at about 360° C. Furthermore the constituents of the initial materials which before the treatment are non-distillable and readily coked, as for example asphaltic substances of tars or humic substances of coals, are at the same time considerably degraded by the destructive hydrogenation so that in some cases, depending on the reaction conditions, they even yield an additional amount of valuable polynuclear compounds. By the lowering of the boiling point and by the removal of the asphaltic substances, the ring compounds of high molecular weight are distillable without decomposition. Other compounds, as for example those containing oxygen, nitrogen or sulphur, may be split up during the hydrogenation and this facilitates the separation of the remaining compounds.

By the dehydrogenation, the hydro compounds are reconverted or converted into the corresponding less hydrogenated, as for example purely aromatic, compounds, which have by nature a high melting point and pronounced crystallizing power and which are readily split up by fractional crystallization into the desired pure substances. The yield of cyclic compounds may be still further increased in some cases by carrying out the dehydrogenation under such strong conditions that side chains present on the aromatic nucleus are split off.

The dehydrogenation may be effected in any suitable manner. However, several methods have been found to be of particular value, and these will now be described in detail.

One such method consists in heating the material to be treated to temperatures of from 400° to 700°, especially from 400° to 500° C., preferably while employing catalyst. If it is desired to split off any side chains present, the destructive hydrogenation product is preferably heated to temperatures of from 500° to 1000°, advantageously from 550° to 700° C.

As catalysts may be mentioned silver or metals of the 2nd to 8th groups of the periodic system, as for example magnesium, zinc, aluminum, silicon, titanium, tin, lead, vanadium, chromium, molybdenum, tungsten, uranium, manganese, iron, nickel, cobalt, or rare earth metals, preferably in the form of their compounds, as for example oxides, sulphides, phosphates or halides, or mixtures of such substances. These catalysts may be applied to carriers, as for example active carbon, activated brown coal small coke which has preferably been de-ashed or neutralized with acid, active silica, magnesia or bleaching earths. The dehydrogenation may be carried out in the presence of hydrogen under a total pressure for example of from 5 to 200 atmospheres or more. It is advantageous to employ a partial pressure of hydrogen of less than 50 atmospheres, when the total pressure is 200 atmospheres. Other gases or vapors, as for example water vapor, nitrogen, carbon monoxide or methane, or gas mixtures, as for example water gas, may also be present. Especially valuable results are often obtained by working in the presence of carbon dioxide. For dehydrogenations in the presence of hydrogen, the oxides or sulphides of metals from the 5th and 6th groups of the periodic system, if desired in admixture with other metal compounds, are especially valuable as catalysts.

When it is desired to increase the yield of cyclic hydrocarbons by splitting off side chains which may be present, the dehydrogenation may be carried out first at comparatively elevated temperature, as for example from 350° to 550° C., advantageously in the presence of catalysts, as for example those mentioned above, no splitting off or only an incomplete splitting off of the side chains thus occurring, the resulting products or fractions of the same being then treated with such substances as for example aluminum chloride, boron fluoride, iron chloride, or titanium chloride, if desired with an addition of hydrochloric acid, at temperatures of from 50° to 300° C., advantageously from 80° to 200° C., whereby a splitting off of the side chains from the cyclic nuclei takes place. This may also be effected by treating the dehydrogenated product with potassium permanganate, chromic acid or other oxidizing agents at temperatures of from 80° to 150° C.

The splitting off of the side chains by means of the said action of chlorides or by oxidation may, however, be carried out before the dehydrogenation proper, which in this case may be carried out under milder, non-splitting conditions, especially at comparatively low temperatures and with a short time of contact with the catalyst.

In many cases it is advisable to carry out the dehydrogenation of the destructive hydrogenation products of the bituminous substances in stages. According to this modification the dehydrogenation is carried out under such conditions that only comparatively readily dehydrogenatable compounds are dehydrogenated at first; the dehydrogenated compounds may then be separated as such, as for example by crystallization. The remaining oil is then dehydrogenated under stronger conditions, the more difficultly dehydrogenatable compounds thus being converted into crystallizable form. If necessary the oily fraction remaining may be subjected to dehydrogenation under still stronger conditions in one or more further stages.

In the catalytic dehydrogenation trouble may be experienced by reason of local overheating or of substances being deposited on the surface of the catalysts and the consequent alteration in the activity of the catalyst, whereby an unavoidable decrease in the yield takes place.

We have found that this disadvantage is avoided by carrying out the dehydrogenation of the products obtained by destructive hydrogenation in the liquid phase in the presence of finely divided catalysts when are led through the reaction zone together with the products to be treated. For this purpose a small amount, for example from 0.1 to 5 per cent or more, of a finely divided catalyst is added to the hydrogenation product. Suitable catalysts for this purpose are those mentioned above. The initial materials to be dehydrogenated are mixed with the finely divided catalyst and either heated in a gas-heated system, as for example a pipe coil, and then led through an unheated or heated reaction chamber, or for example led through an apparatus heated to the reaction temperature. It is advantageous to add the catalyst only during or after the preheating, and it may also be added in fractions to the material to be treated at several places in the apparatus. The catalyst is separated from the reaction products for example by centrifuging, filtration or distillation and may then be added to fresh hydrogenation products to be dehydrogenated, if desired after complete or partial regeneration.

We have found that complete dehydrogenation can be effected in a simple manner and the desired compounds obtained in good yields by working with a pressure which should generally not exceed 200 millimeters, pressures of from 2 to 70 millimeters (mercury gauge) being employed for example. The temperature for the dehydrogenation according to this method is usually between 100° and 700°, advantageously between 300° and 700° C. Suitable metals of the 3rd to the 8th groups of the periodic system or their compounds for example molybdenum, tungsten, chromium, uranium, rhenium, manganese and vanadium or their oxides, sulphides and phosphates. It is advantageous to carry out the dehydrogenation in the presence of hydrogen which should, however, not have too high a partial pressure, for example a partial pressure of from 5 to 30 millimeters at a total pressure of 50 to 100 millimeters.

Another method consists in working in the presence of finely divided metals or their compounds in an amount of .01 to 5%, and of acid substances, in particular acids or substances forming the same under the reaction conditions in a lesser amount. It is specially advantageous to employ as catalysts for this purpose metals of the 2nd group, the 4th group, the 7th group and the iron group, as for example zinc, magnesium, titanium, silicon, lead, manganese, iron and tin, the latter advantageously in the form of its compounds. The following are also suitable: aluminum, copper, sodium, potassium and calcium, and also chromium, vanadium, molybdenum and tungsten, the latter chiefly in the form of their oxides and sulphides. The catalysts may also be applied to carriers, in which case they need not necessarily be employed in a finely divided state. Suitable carriers are those mentioned above. It is preferable, however, that in any case the catalyst should be in a finely divided state.

The acid substances which are added are the halogens, as for example chlorine, bromine or iodine, or their compounds with hydrogen, carbon or ammonia, as for example carbon tetrachloride, or readily decomposable metal compounds of these halogens. Other acids, as for example sulphuric acid, nitric acid, phosphoric acid, sulphurous acid or sulphonic acids or carboxylic acids, as for example formic acid or acetic acid, may also be employed. The metal or compound acting as catalyst may be added to the initial material before or during the heating up. The acid substances may be added at elevated temperature, for example at between 50° and 200° C., and at a time when the initial material already contains the metal or metal compound. It has, however, been found to be more advantageous to add the acid substance before the commencement of the heating or during about the first half of the temperature range through which the product is heated in order to attain the reaction temperature. In this case the metal or metal compound may be added simultaneously or, preferably, at a higher temperature, as for example during the second half of the heating period or after the heating.

It has been found to be most advantageous to carry out the process in the liquid phase and continuously so that the catalyst remains for but a short time in the reaction chamber and suffers no injurious change in its activity; in this manner, moreover, the formation of polymerization products and the splitting of the initial materials by local overheating are avoided. It may, however, also be carried out in the gaseous phase by passing the vapors over the finely divided catalysts, while adding the acid substances prior to the entrance into the catalyst chamber. It is advantageous to maintain a high partial pressure of the initial materials. It is preferable to work at temperatures of from 400° to 600° C., the speed of flow and the time during which the substances are present in the reaction chamber being such that practically no splitting off of carbon chains from the initial material takes place but only a splitting off of hydrogen. The reaction may be carried out at atmospheric, reduced or, preferably, increased pressures, as for example at from 10 to 50 atmospheres or more.

Dehydrogenation, if desired while splitting off side chains from cyclic compounds, can also be effected by exposing the initial materials, if desired in the presence of solvents, to the action of silent electric discharges under such conditions as to temperature and duration that the formation of polymerization products is substantially avoided. For this purpose, the initial materials are subjected in the usual Siemens' ozone tubes or in apparatus of a similar kind to treatment with silent electric discharges, produced with high tension electric currents, having a tension of at least 50 to 200 volts and preferably above 1000 volts, preferably of high frequency. The frequency should be at least 16 periods and preferably range above 1000 periods per second. When employing initial materials of high boiling point, i. e. above 350° C., it is sometimes advantageous to carry out the reaction in the presence of preferably inert, solvents, as for example illuminating oil or paraffin wax, which are preferably added only in the course of the reaction. As a general rule no discoloration of the foam formed on the liquid under treatment shuld take place, since this indicates the beginning of a polymerization. The conditions should be such in all cases that the products undergo no appreciable increase in viscosity, i. e. the reaction should be interrupted when merely the dehydrogenation and/or the splitting off of side chains has taken place. The reaction usually proceeds at a temperature of from 20° to 90° C. which should be the higher, the higher the viscosity of the initial material. The duration of the treatment is from about two to ten hours. The treatment may also be carried out in the presence of substances having a catalytic action, for example those mentioned above.

The dehydrogenation may also be carried out in other ways as for example by leading the material to be treated over copper at 350° C. while adding a measured amount of air or oxygen, or by heating it for example at from 150° to 300° C. with sulphur. Agents combining with hydrogen, as for example selenium, tellurium, nitrogen oxides or dilute nitric acid, may also be employed. The dehydrogenation may also be effected by treatment with halogen directly or by halogenation and splitting off hydrogen halides, if desired while adding catalysts. These latter methods have the advantage that they may be carried out at comparatively low temperatures and that the reaction materials are only within the reaction chamber for a short period of time.

A method of treatment which is somewhat related to dehydrogenation in that a splitting off of hydrogen may take place therein, is the distillation of the destructive hydrogenation products with an addition of metals or of condensing or polymerizing agents. For this purpose, the oils are distilled at atmospheric, increased or preferably under reduced pressure. Suitable metals are those from the 1st and 2nd groups of the periodic system and of these the alkaline earth metals and especially the alkali metals are to be recommended. The employment of metals of the 8th group of the periodic system, as for example iron, is not advisable as a rule. Sodium, potassium, lithium, calcium and zinc may be mentioned as suitable metals. Aluminum chloride, zinc chloride, titanium chloride, ferric chloride, stannous chloride, or boron fluoride, if desired in admixture with substances retarding the reaction, as for example zinc oxide, may be employed for example as the condensing or polymerizing agents, which should be of the type promoting the Friedel-Crafts reaction. The metals or other agents are usually employed in rather small amounts, as for example from 0.1 to 10 per cent of the weight of the oils. The oils may also be treated prior to distillation with a small amount, as for example from 1 to 5 percent of a condensing agent at ordinary or elevated temperature, as for example up to 150° C. In this case it is not necessary to add metals or condensing or polymerizing agents during the distillation.

*The removal of paraffin wax*

The separation of the paraffin wax from the destructive hydrogenation products is effected in known manner. For example the destructive hydrogenation products or their fractions of high boiling point may be mixed with the same or a larger amount of methyl formate and the whole cooled to about zero C. The paraffin wax is thus precipitated while the oil with the crystallizable compounds contained therein are kept in solution. Instead of methyl formate, other solvents may be employed in which paraffin wax is soluble only with difficulty at low temperatures, as for example liquid sulphur dioxide, nitrobenzene, aniline, chlorinated hydrocarbons, as for example tetrachlorethane or trichlorethylene, or mixtures of ether and alcohol or of ether and acetone, or hydrocarbons of low boiling point. The paraffin wax is then separated by filtration or centrifuging and the oil freed from solvent.

*The removal of asphaltic and related substances*

A separation of asphaltic substances, by which expression we understand not only hard asphalt and pitch-forming constituents (the latter are mostly olefines of high molecular weight tending to form asphalts under the influence of oxygen and/or heat), but also soft asphalts, may be effected by any known or suitable method.

Thus, it is possible in some cases to effect a separation by filtration or centrifuging. In other cases a treatment with adsorption agents or a refining treatment with the usual refining agents may be sufficient. As examples of such adsorption or refining agents may be mentioned concentrated sulphuric acid, chlorosulphonic acid, or salts having a condensing action, as for example iron chloride, aluminum chloride and zinc chloride, or fuller's earth, if desired impregnated with sulphuric acid, bleaching earths or active carbon.

In some cases, especially in the case of destructive hydrogenation products which contain a certain amount of oils rich in hydrogen, as for example aliphatic or hydroaromatic hydrocarbons, in addition to asphaltic substances, mineral acids in a diluted state may be employed as precipitants, as for example sulphuric acid of 20 per cent strength or 30 per cent waste sulphuric acid derived from mineral oil refining.

However, it is generally speaking preferable to effect the precipitation of asphaltic substances by more efficient methods, more particularly by distillation or with the aid of selective solvents.

This may be effected by distilling the initial materials at temperatures at which practically no decomposition takes place, until a pitchy residue is obtained. The distillation may be carried out in the presence of gases, such as hydrogen or nitrogen, or of vapors, such as steam. Atmospheric pressure may be employed, for example at temperatures of up to 350° C., or more advantageously, if desired in a subsequent stage, reduced pressure, as for example from 10 to 15 millimeters (mercury gauge), may be employed, at temperatures up to about 350° or 400° C. Care should be taken that no trace of the pitchy residue passes over during the distillation because even small amounts of this substance in the distillate may injure the activity of the catalyst in a subsequent catalytic treatment, and also that all fractions boiling up to temperatures of 300°, if desired up to 350° C. at from 10 to 15 millimeters (mercury gauge) pass over in order to obtain the greatest possible yield of distillate.

The initial materials may also be freed from asphaltic substances by means of selective solvents, as for example alcohols, phenols, aniline, ketones, nitrobenzene, organic chloro compounds, acids, esters, or liquid sulphur dioxide. This treatment is preferably effected after separation of the water and the low boiling oil constituents. The degree of topping of the hydrogenation products and the boiling ranges of the solvents or precipitants to be employed are preferably so adjusted to each other that the solvents or precipitants may be readily recovered from the products, as for example by distillation. The amount of solvent and the temperature of the treatment may be so selected that only substances consisting mainly of hard asphalt are removed from the initial materials.

Another class of selective solvents which may be employed with great advantage, leaves the asphaltic substances undissolved. As most typical examples among this class of solvents may be mentioned hydrocarbons rich in hydrogen, i. e. containing at least 13 parts of hydrogen for each 100 parts of carbon, as for example distillates of petroleums or of destructive hydrogenation products, for instance benzines or gas oils, or hydrogenated naphthalenes. Liquefied hydrocarbons which are gaseous at ordinary temperatures are especially suitable, for example propane, mixtures of propane and ethane or butane.

The products which have thus been freed from asphaltic substances, may be subjected to a refining, as for example with sulphuric acid or aluminum chloride or with an adsorption agent, such as bleaching earths, before the further treatment.

The asphalts may be removed by fractional precipitation by first precipitating only the most difficultly soluble and most readily decomposable asphaltic substances by the addition of only small amounts of precipitant, by using a short time of precipitation or by using a high precipitating temperature or by using more than one of these methods in combination and then further amounts by increasing the amount of precipitant or the duration of precipitation or by decreasing the temperature. The second fraction, and if desired, further fractions of the precipitated substances consist of asphaltic substances of lower molecular weight which have a lower melting point and are less readily decomposable. The last quantities of asphaltic substances which are only separable by strong precipitating conditions are frequently comparatively mobile oily substances of less pronounced asphaltic character.

The fractionation of the asphaltic substances is also of advantage in the case of hydrogenation products free from dust because a certain separation of the crystallizable compounds takes place and because in the subsequent distillation of the asphaltic substances, if such is employed, the less decomposed distillation residues of the second and subsequent asphalt fractions are obtained separate from the usually coked residues of the first asphalt fraction.

*The separation of the polynuclear compounds*

For the separation of the single polynuclear compounds from the products containing the same, use may be made for example of cooling, precipitation, crystallization, dissolution or distillation, each of which treatments may be a fractional one, or several of these methods may be used in combination. In some cases it may be advantageous to refine the crude distillates for removing resinous constituents, as for example by treatment with concentrated sulphuric acid or with caustic alkali solution or with hydrogen under moderate conditions in the presence of refining agents, for which purpose agents having adsorbent properties may be used. The substances of high molecular weight in part often crystallize directly after this first rough separation. The further separation may be carried out by the usual methods, as for example by further distillation or crystallization, the latter being carried out if desired with the addition of precipitants or solvents, or by chemical methods, as for example fusion with caustic potash, sodium amide or alkali metals, or sulphonation.

For example, phenanthrene may be recovered from a fraction passing over between 325° and 345° C., anthracene from the fraction boiling between 300° and 400° C., fluorene from the fraction boiling between 295° and 320° C., or pyrene and chrysene, which may be separated from each other by means of carbon disulphide, from the fraction boiling above 390° C. The precipitated compounds may be separated from the oil by centrifuging or filtering at moderately elevated, ordinary or reduced temperatures, if desired while employing a diluent as for example benzene, pyridine, glacial acetic acid or dioxane. By crystallization from a suitable solvent or by dissolution and precipitation, the substances may be obtained in a state of great purity. Furthermore several of the said substances may be separated from fractions having a comparatively wide boiling point range, the single substances being separated from each other by fractional crystallization or treatment with different solvents or by dissolution and precipitation in stages with the same or different precipitants. When the compounds to be recovered do not crystallize at ordinary or reduced temperatures, the unitary substances may be recovered by fractional distillation, preferably in vacuo.

The oily fraction remaining after the separation of the crystallizable compounds may be subjected again to dehydrogenation either alone or together with fresh destructive hydrogenation products or fractions thereof, further amounts of crystallizable products often being obtained from the fractions of high boiling point of the resulting products.

It is also possible to separate from the hydrogenation products of high boiling point the crystallizable, partially hydrogenated polynuclear compounds and to subject only the latter to the dehydrogenation.

In order to isolate unitary substances which have not been deposited by cooling of the distillates, the oil freed from crystals may be treated with picric acid. The picrates thus formed may then be separated from the oil by filtration or centrifuging. Cyclic compounds may be isolated from the fractions of the distillate consisting of viscous constituents of high boiling point and also from the distillation residue by treatment with selective solvents, as for example by extraction with one or more solvents, if desired in stages. Suitable solvents are for example illuminating oil, carbon disulphide, alcohol, benzene or xylene.

In the following we shall now give a detailed description of the methods claimed in this application in which use is made of one or several of the steps or operations specifically described in the foregoing.

One such method consists in separating the asphalts and asphaltic substances from the destructive hydrogenation products, subjecting the separated substances including the asphalts to a distillation and recovering the polynuclear compounds from the distillates.

The distillation of the separated asphalt or asphaltic substances is preferably effected in the most protective manner in order to avoid any decomposition of the heat-sensitive asphaltic substances, as for example by employing steam or a high vacuum or both. The valuable polynuclear compounds to be recovered usually separate from the crude distillates of the asphalt in a readily crystallizable condition. In order to complete the deposition or to effect a separation into unitary pure substances a sharp fractionation of the crude distillate is recommended. By employing suitable solvents for the precipitation of the asphaltic substances, the separation may be considerably facilitated. In some cases chemical methods of treatment of the asphalt distillates, as for example the removal of resinous substances by treatment with concentrated sulphuric acid or caustic alkali are preferable.

In many cases it is advantageous for the recovery of valuable polynuclear compounds, especially of compounds of high molecular weight which contain for example up to about 10 rings in the molecule, to combine the method described above for the precipitation of the valuable compounds together with the asphalts and asphaltic substances, with the method involving dehydrogenation. This is effected by first adding hydrogen to the asphalt or asphaltic substances separated in the said manner by means of a careful destructive hydrogenation at the lowest possible temperature, as for example at from 300° to 400° C., and under high pressure, the resulting hydrogenation product being freed from any residual asphaltic substances still present, if desired, with an addition of refining agents as for example caustic alkalies or metallic sodium, then dehydrogenated and split up by physical or chemical methods into pure crystalline polynuclear compounds of high molecular weight.

Cyclic compounds of very high molecular weight may also be separated by protective methods from the hydrogenated asphaltic substances. This may be effected for example by distilling the whole product under a high vacuum and by means of large amounts of superheated steam, or by separating any residual asphaltic substances still present by the addition of precipitants or adsorption agents or by treatment with comparatively concentrated sulphuric acid. The distillate or refined product is then dehydrogenated to the corresponding aromatic substances, by one of the methods described above. The separation into pure, chemically unitary substances is then effected as already described.

However, not only the asphalts and related substances contain the valuable polynuclear compounds, but these are present, often in still larger amounts than in the asphalts, in those portions of the destructive hydrogenation products which have been freed from the asphaltic and related constituents and may be recovered therefrom in any suitable manner.

Referring now to the distillation of the destructive hydrogenation products with metals or with condensing or polymerizing agents, as described above, this is usually combined with other treatments in such a manner that the process consists in freeing the destructive hydrogenation products or their fractions wholly or partly from asphalts and asphaltic substances as suggested above and preferably from substances not having a neutral reaction and also advantageously from any paraffin wax present, distilling the resulting product with an addition of metals or of condensing or polymerizing agents and isolating the unitary, in particular polynuclear, compounds by physical or chemical methods from the purified destructive hydrogenation products. The oils thus freed from asphaltic substances may be further treated with adsorption agents, such as bleaching earths or active carbon, preferably in the presence of solvents which are incapable of dissolving resinous substances in an absorbed condition, as for example alcohol, ketones or mixtures of alcohol and benzene. The oils thus purified, when they contain paraffin wax, are advantageously cooled to low temperatures in the presence of a diluent. The paraffin wax deposited is separated from the oil solution. The latter is then freed from solvent, the bases then being preferably removed by treatment with acids, as for example sulphuric acid, and the phenols by washing with alkaline liquors, as for example caustic soda solution. If the subsequent distillation is to be carried out in the presence of metals, it has proved advantageous to remove at least the acid constituents. If, however, the distillation is to be carried out with condensing or polymerizing agents, the removal of the acid and basic substances is not necessary, though advantageous. When the resulting distillate is cooled, large amounts of crystallizable substances separate.

It is frequently advantageous to subject the pretreated destructive hydrogenation products to a dehydrogenation before or after the distillation with an addition of metals or condensing agents. This may be effected in the manner fully explained above. When the distillation is effected prior to the dehydrogenation, it may be advantageous to carry out a further distillation in the presence of metals or condensing agents after the dehydrogenation. The procedure may also be, however, that the distillation is carried out under such conditions of temperature that a dehydrogenation of the destructive hydrogenation product is effected at the same time. From the oils freed from the crystallized compounds it is frequently possible to isolate still further amounts of such compounds by subjecting the oils to a dehydrogenation and, if desired, again to a distillation in the manner already described.

For the complete recovery of the valuable unitary compounds from the destructive hydrogenation products it is sometimes advantageous to subject the soft asphalts and asphaltic substances, when these have been removed by the flocculation, to a distillation with scavenging gases and/or under a high vacuum, preferably in the presence of the agents already described, and to isolate from the distillate the unitary compounds contained therein.

The yield of valuable unitary compounds may frequently be still further increased by subjecting the oils freed from crystallizable compounds to a fresh dehydrogenation. Further amounts of crystallizable compounds may then be separated from the products thus formed. The procedure may also be that hydro derivatives of the desired compounds are separated, as for example by distillation, from the pretreated oils, the desired compounds then being produced therefrom subsequently by dehydrogenation.

Still another method of working is based upon the discovery that the fractions of highest boiling point of destructive hydrogenation products of mineral coals or of mineral coal tar or their dehydrogenation products constitute tough, usually hard glassy masses which are very difficult to split up, so that the valuable unitary carbon compounds cannot be recovered therefrom by the methods hitherto known.

We have found that the pitch forming substances contained in the said masses act as agents assisting dissolution and thus prevent the recovery and especially the crystallization of the unitary compounds to a large extent, and that it is possible by the removal from the said masses of the pitch forming substances, to separate therefrom unitary carbon compounds.

The removal of the substances which form pitch may be effected by treatment of the initial materials with a solvent, as for example with hot alcohol or a mixture of alcohol and benzene, toluene or xylene, or with ketones, such as acetone, or halogenated hydrocarbons, such as chloroform and ethylene chloride, in the presence of adsorption agents, such as fuller's earth, bleaching earths or active carbon. The refining may also be carried out with acids, especially strong inorganic acids, such as sulphuric acid or chlor-sulphonic acid or salts having a condensing action, such as iron chloride, aluminum chloride and zinc chloride, preferably in the presence of solvents. Substances having unitary boiling or melting points can be recovered from the purified masses by the usual methods.

In some cases the asphalts may be separated from the parent oils prior to destructive hydrogenation. Again the liquid substances remaining after removal of the desired polynuclear compounds have the character of middle or heavy oils and may be converted into benzine, for example by cracking or destructive hydrogenation.

According to this modification of the present invention the asphalt, preferably the hard asphalt only, is first separated from the said substances. This may be effected by the usual methods. The oils thus freed substantially from the hard asphalt are then treated with hydrogen in the presence of catalysts. This destructive hydrogenation should take place mainly under hydrogenating conditions as described in detail above.

From the products arising from the destructive hydrogenation, if desired after a dehydrogenation and preferably after first splitting them up into fractions, the unitary, in particular polynuclear, compounds are obtained by the methods described above. The oils freed from the said compounds may then be dehydrogenated. Further amounts of unitary compounds may be separated in the manner already described from the resulting dehydrogenated products.

It will be readily understood from the foregoing that it is not necessary according to the present invention to use the destructive hydrogenation exclusively for the production of valuable polynuclear compounds. It is often very advisable to combine the process in accordance with the present invention with the usual destructive hydrogenation for the production of oils for motor fuels, impregnating, lubricating and similar purposes. This may be done by employing for the recovery of the valuable polynuclear compounds only those fractions of the crude destructive hydrogenation products which are particularly suitable for this purpose, the other fractions being worked up in the usual manner for the production of benzines, lubricating oils and so on. Of course, only such destructive hydrogenation products or fractions thereof are suitable for the purposes of the present invention as contain cyclic constituents and as have a boiling point of at least 150°, preferably at least 250° or 280° C.

We shall now further explain our invention by giving a number of specific examples, but we wish it to be understood that our invention is in no way limited to these examples. When in the examples we speak simply of parts, these are are always meant to be parts by weight.

*Example 1*

100 kilograms of a distillation residue (obtained by the distillation of a destructive hydrogenation product of mineral coal up to 280° C.) having a softening point according to Krämer-Sarnow of 35° C. and containing 25 per cent of insoluble coal and ash constituents, are mixed at 200° C. with 20 kilograms of a kerosene fraction having a boiling point of from 160° to 230° C. After about one hour, 40 kilograms of hard asphalt and insoluble constituents have been deposited. The supernatant oil is withdrawn. There separate therefrom after from about 3 to 5 hours 40 kilograms of a soft asphalt free from insoluble constituents. 40 kilograms of a mobile, red-brown oil poor in asphalt remain. The precipitant is recovered from all three fractions by blowing with steam. The soft asphalt free from insoluble constituents is distilled at 10 millimeters (mercury gauge) while employing an equal amount of superheated steam. 30 kilograms of a distillate of high boiling point are obtained. When it is allowed to stand, crystals separate therefrom which consist of chrysene, pyrene, carbazol and fluorene. The pyrene is obtained in a pure form by crystallization from benzene.

*Example 2*

Ground gas flame coal is impregnated with an amount of hydrochloric acid sufficient to neutralize the alkalinity of its ash, dried and triturated to a paste of high consistency with fused mineral coal tar soft pitch having a melting point of 50° C. while adding ferric oxide gas purifying mass impregnated with ammonium molybdate solution in the ratio of 20:10:1 at a temperature of 150° C. The paste is pumped at a temperature of 150° C. through a short wide pipe into and through a pressure vessel provided with a stirrer and therein hydrogenated at 470° C. with hydrogen under a pressure of 250 atmospheres, the period during which the reaction materials are present in the reaction chamber being 20 minutes. The solid ash and coal constituents are centrifuged out from the hydrogenation product and the fraction of lowest boiling point is distilled off up to 280° C. The remaining distillation residue is stirred with 50 per cent benzine, the asphaltic substances contained therein thus being deposited and separated. The oil is then carefully fractionally distilled in vacuo while employing a column and the single fractions are dehydrogenated separately. The fraction passing over between 250° and 270° C. at 50 millimeters (mercury gauge) is dehydrogenated by leading it with 40 cubic meters of air for each 100 kilograms of oil over a catalyst composed of 50 per cent of iron oxide, 20 per cent of alumina and 30 per cent of copper at 380° C. or by heating it with 20 per cent of flowers of sulphur for 2 hours at 300° C., or by leading it over 5 per cent of ferric oxide gas purifying mass and 0.3 per cent of nickel oxide, at 510° C. with hydrogen under a partial pressure of 30 atmospheres. After cooling to 10° C., pyrene separates in an almost pure form from the dehydrogenated product.

*Example 3*

The soft asphalt fraction obtained according to Example 1 is subjected to destructive hydrogenation at 390° C. under a pressure of 230 atmospheres in the presence of an iron-molybdenum catalyst. The resulting product is freed from small amounts of asphalt by stem distillation in a high vacuum. The distillate is passed in the vaporous state together with steam at 560° C. over a catalyst consisting of zinc oxide, alumina and molybdenum oxide. In the condensed reaction product 10 per cent of picric acid are dissolved. On cooling, a picrate separates out in the form of long red needles, from which by decomposition by means of ammonia and recrystallization from alcohol a hydrocarbon is obtained which according to analysis has the formula $C_{18}H_{13}$.

*Example 4*

A sludgy residue derived from the destructive hydrogenation of mineral coal is freed from solid constituents by centrifuging, freed from asphalt by means of illuminating oil, and then heated to 280° C. in a preheater. After this preheating, the mass is led into a reaction chamber charged with a catalyst of molybdenum, zinc and magnesium, in which a temperature of 500° C., a pressure of hydrogen of from 30 to 40 millimeters and a total pressure of 70 millimeters (mercury gauge) are maintained. The throughput amounts to 0.15 kilogram of oil per liter of furnace volume per hour. The resulting dehydrogenation product is fractionally condensed in a separator which is also under a reduced pressure of hydrogen. After allowing the fractions to stand for a considerable time, about 20 per cent of crystals separate consisting mainly of pyrene, chrysene, anthracene, acenaphthene, naphthanthracene, picene and methylnaphthalenes, which are separated from the mother liquor by pressing and purified by fractional crystallization from mixtures of alcohol and benzene. By adding picric acid solution to the mother liquor, about 5 per cent of crystalline compounds are obtained in the form of picrates which may be decomposed with ammonia to form hydrocarbons which may be separated from each other by fractional crystallization.

*Example 5*

A fraction, boiling above 235° C., of an oil obtained by the destructive hydrogenation of coal is treated at 80° C. with three times its amount of propane. The asphalt precipitated is separated from the oil solution. The oil, freed from propane, is then treated for from four to five hours in a Siemens' ozone tube at a temperature of 70° C. under a pressure of 7 millimeters (mercury gauge) with silent electric discharges of 7,000 volts and 10,000 periods. The reaction product is then diluted with benzine in the ratio of 1:1 and filtered to separate small amounts of insoluble polymerization products. The filtrate is freed from benzine by distillation and then split up by distillation in vacuo into fractions of narrow boiling point range, as for example fractions each having a boiling point range of 10° C. The single fractions are then diluted with a mixture of ether and alcohol and cooled to 40° below zero C., a high yield of solid crystallized aromatic hydrocarbons, especially crude pyrene from the fraction boiling at 320° to 400° C. thus being obtained.

*Example 6*

The fraction boiling above 350° C. of a product obtained by the destructive hydrogenation of mineral coal is freed from solid constituents and hard and soft asphalts by distillation in vacuo. The oily distillate thus obtained in a yield of 80 per cent is diluted with twice its volume of methyl formate, cooled to 3° below zero C. and freed by filtration from the paraffin wax which has separated in an amount of 3 per cent. The oil is then freed from solvent by distillation and washed with caustic soda solution of from 5 to 10 per cent strength, the acid constituents thus being dissolved out in an amount of about 3 per cent. The basic constituents are then removed in an amount of 2 per cent by washing with sulphuric acid of from 5 to 10 per cent strength. The oil thus pretreated is fractionally distilled in a vacuum of 1 millimeter (mercury gauge) with 1 per cent of metallic sodium. From the fractions there are obtained in a yield of about 7 per cent crystallized substances consisting mainly of carbazole, anthracene, pyrene, and chrysene. The oil separated from the crystallized substances is led at 550° C. in an atmosphere of hydrogen under a pressure of 40 millimeters (mercury gauge) over a catalyst consisting of nickel sulphide and molybdenum sulphide, dehydrogenation thus being effected. The oil obtained is split up by distillation into several fractions from which fluoranthene, pyrene, chrysene, retene, picene and other cyclic compounds crystallize in a yield of 5 per cent.

Example 7

The fraction boiling above 350° C. of a product obtained by the destructive hydrogenation of mineral coal is freed from hard and soft asphalts and paraffin wax as described in Example 6. The oil is then freed from solvent by distillation and subjected to fractional vacuum distillation with an addition of 8 per cent of aluminum chloride. From the fractions are obtained in a yield of about 7 per cent crystallized substances which consist mainly of carbazole, anthracene, pyrene and chrysene. The oil separated from the crystallized substances is led in an atmosphere of hydrogen at 550° C. under a pressure of 20 atmospheres over a catalyst consisting of nickel sulphide and molybdenum sulphide, whereby dehydrogenation takes place. The oil thus obtained is split up by distillation into several fractions from which cyclic compounds, mainly crude pyrene, crystallize in a yield of 5 per cent.

Example 8

The fraction boiling above 300° C. of a destructive hydrogenation product of mineral coal is led at 550° C. at atmospheric pressure in the presence of hydrogen over a catalyst consisting of nickel sulphide and molybdenum sulphide. The dehydrogenation product thus obtained is distilled. The fraction boiling above 400° C. constitutes a tough glassy mass. 100 parts of this mass are heated to 80° C. while stirring under a reflux condenser with 12 per cent of heavy benzine or 8 per cent of benzene and with 5 per cent of fuller's earth for half an hour, the fuller's earth with the adsorbed and partly polymerized resinous substance being filtered off. A filtrate is obtained from which after removing the solvent 30 parts of a crystal pulp separate. By extraction of the crystal pulp with alcohol 15 parts of crude pyrene are obtained therefrom and by subsequent extraction with glacial acetic acid 5 parts of chrysene are obtained which may be purified by crystallization as such or by way of the picrate. By extracting the extraction residue with an equal amount of toluene at 40° C., chrysene is obtained. The oily residue (60 parts) separated from the crystal pulp is boiled with xylene, the mixture cooled to 20° C. and the liquid poured off at the said temperature from the undissolved portion. The solvent is distilled off from the xylene solution or the solution is cooled to zero C. or lower, whereby 3 parts of a crystallized hydrocarbon having a green fluorescence are obtained which is $C_{36}H_{22}$ and the melting point of which is 308° C. A determination of the molecular weight yields a value of about 430.

A similar effect is obtained when the fraction of high boiling point to which 70 per cent of a mineral coal tar fraction boiling between 150° and 220° C. has been added, is treated at 80° C. with 10 per cent of 60 per cent sulphuric acid, then freed from acid tar, washed with 5 per cent of 10 per cent caustic soda solution and extracted in the manner already described.

Example 9

The fraction boiling above 300° C. of a destructive hydrogenation product of mineral coal having an asphalt content of 7 per cent is mixed with three times its amount of a benzine containing 14 parts of hydrogen for each 100 parts of carbon and boiling between 40° and 150° C. The precipitated asphaltic constituents are separated and the solution freed from benzine by distillation. The oil is then heated to 320° C. together with hydrogen under a pressure of 250 atmospheres and led over a catalyst consisting of tungsten sulphide. The reaction product thus obtained is practically free from unsaturated hydrocarbons and to a great extent free from compounds containing sulphur and oxygen. This product is then led together with hydrogen under a pressure of 50 atmospheres at 490° C. over a catalyst consisting of cobalt sulphide and tungsten sulphide. The reaction product obtained is then split up into fractions from which by cooling crystalline cyclic compounds are separated, such as fluoranthene, pyrene, chrysene, anthracene and picene.

Example 10

Ruhr mineral coal in finely ground and made into a paste in the ratio of 1:1 with a heavy oil obtained from the same coal by destructive hydrogenation. The coal paste is mixed with 1 per cent of finely ground tin oxalate and 0.85 per cent of carbon tetrachloride. This mixture is then led together with hydrogen under a pressure of 200 atmospheres through a gas-heated pipe system in which it is heated to 425° C. Before entry into the reaction chamber, 1 per cent of tin oxalate, suspended in a finely ground form in heavy oil, is added to the mixture. The throughput is 0.23 kilogram of coal paste per liter of reaction space per hour. The reaction materials then pass into a separator heated to 415° C. in which a definite level of liquid is maintained. The gases and vapors pass into an adjacent stripping vessel.

The degradation of the carbon of the coal amounts to 93 per cent, the gasification is 11.5 per cent, calculated with reference to the oil formed from the coal and the gaseous constituents, and the asphalt content of the heavy oil leaving the reaction chamber is 3 per cent. The product collecting in the stripping vessel consists of 50 per cent of constituents boiling up to 325° C. These are removed by distillation. The residue is then refined with dilute sulphuric acid in the presence of 1 per cent of fuller's earth. The residue thus freed from resin is then split up in vacuo into several fractions from which pyrene, phenanthrene, anthracene, fluorene and methylanthracene, dimethylanthracene, methylnaphthalene, dimethylnaphthalene and methyl fluorene are recovered by cooling. The oils freed from unitary compounds obtained from the single fractions are united and added to the product withdrawn from the separator, consisting of oil fractions of high boiling point and coal particles. This product is centrifuged and the resulting oil is employed for making fresh coal into a paste.

The distillation residue from the stripping vessel product may also be mixed with the product withdrawn from the separator and the mixture centrifuged. The centrifuged oil is then mixed with hydrocarbons rich in hydrogen so that the asphalt and small amounts of solid substances are precipitated. The oil free from asphalt is separated as already described, refined with sulphuric acid and fuller's earth and then split up into fractions from which the said unitary cyclic compounds are removed.

The oil freed from the said substances is employed for making fresh coal into a paste.

*Example 11*

Finely ground mineral coal is impregnated with an amount of hydrochloric acid sufficient to neutralize the alkalinity of its ash and then with ammonium molybdate. The coal thus pretreated is then mixed in the ratio of 1:1 with a heavy oil obtained from the same coal by destructive hydrogenation. The resulting paste is treated at 475° C. with hydrogen under a pressure of 200 atmospheres. The ash and coal constituents are separated from the reaction product by centrifuging and the fractions of low boiling point distilled off. The distillation residue is stirred with 50 per cent of benzine and the asphalt which flocculates separated.

The oil free from asphalt is then split up into fractions and the latter are led in an atmosphere of hydrogen at a pressure of 40 millimeters (mercury gauge) over molybdenum sulphide at 550° C., whereby dehydrogenation takes place. Acenaphthene, anthracene, pyrene, and chrysene may be separated from the dehydrogenation product. The acenaphthene is introduced into an autoclave together with 8 per cent of nickel which has been obtained by the reduction of nickel nitrate. With a temperature of 270° C. and an initial pressure of hydrogen of 95 atmospheres, tetrahydroacenaphthene is obtained.

Similarly hexahydropyrene is obtained from pyrene at 300° C. under an initial pressure of hydrogen of 80 atmospheres. The hexahydropyrene may be converted into decahydropyrene at 210° C. under an initial pressure of hydrogen of 90 atmospheres.

What we claim is:

1. The process of producing polynuclear carbon compounds which comprises subjecting a bituminous material to a temperature of about 200 to 700° C. and a pressure of at least 20 atmospheres in the presence of hydrogen to effect at least a substantial hydrogenation of said material with the formation of products containing a substantial amount of asphaltic substances, separating the asphaltic substances, subjecting the asphaltic substances to a heat treatment under mild conditions to avoid any decomposition of the asphaltic substances and to free the said polynuclear carbon compounds therefrom and recovering said polynuclear carbon compounds.

2. The process as defined in claim 1 wherein the heat treatment to which the asphaltic substances are subjected is a distillation under mild conditions at which decomposition of the asphaltic substances is avoided.

3. The process as defined in claim 1 wherein the heat treatment to which the asphaltic substances are subjected is a distillation in the presence of steam.

4. The process as defined in claim 1 wherein the heat treatment to which the asphaltic substances are subjected is a distillation under a vacuum.

5. The process as defined in claim 1 wherein the heat treatment to which the asphaltic substances are subjected is a treatment with hydrogen under mild conditions.

6. The process as defined in claim 1 wherein the heat treatment to which the asphaltic substances are subjected is a treatment with hydrogen at a temperature of from 300 to 400° C.

7. The process as defined in claim 1 wherein the heat treatment to which the asphaltic substances are subjected is a treatment with hydrogen under mild conditions and wherein the resulting hydrogenation products are freed from any remaining asphalts and subjected to dehydrogenation.

MATHIAS PIER.
KARL SCHOENEMANN.

CERTIFICATE OF CORRECTION.

Patent No. 2,216,130. October 1, 1940.

MATHIAS PIER, ET AL.

It is hereby certified that error appears in the printed specification of the above numbered patent requiring correction as follows: Page 1, first column, line 42, after the word and period "unaltered." insert the following paragraph -

> We have found that polynuclear compounds containing at least four rings are present in destructive hydrogenation products and may be recovered therefrom very readily and simply. More particularly, it has been found that compounds containing four or more nuclei may be produced with great advantage from bituminous substances other than mineral coal high temperature tar. As suitable initial materials for this purpose may be mentioned for example mineral coal, brown coal, peat, wood, lignin, oil shale, mineral oils, natural asphalt, mineral coal and brown coal low temperature tars, as well as fractions and extracts, distillation, cracking and refining residues thereof. ;

page 3, first column, line 73, for "when" read --which--; page 4, first column, line 57, for "shuld" read --should--; page 8, first column, line 55, Example 3, for "stem" read --steam--; and second column, line 24, Example 5, for "235° C." read --325° C.--; page 9, second column, line 22, Example 10, for "in" read --is--; and that the said Letters Patent should be read with this correction therein that the same may conform to the record of the case in the Patent Office.

Signed and sealed this 20th day of May, A. D. 1941.

(Seal)

Henry Van Arsdale,
Acting Commissioner of Patents.